United States Patent [19]

Steele

[11] 4,171,724
[45] Oct. 23, 1979

[54] TOOL FOR LAWN EDGING MACHINE
[76] Inventor: Frank B. Steele, 1225 NE. 8th Ave., Homestead, Fla. 33030
[21] Appl. No.: 877,241
[22] Filed: Feb. 13, 1978
[51] Int. Cl.$^2$ .............................................. A01G 3/06
[52] U.S. Cl. ...................................... 172/15; 172/256; 30/347
[58] Field of Search ................ 56/12.7, 294, 256, 295; 71/27; 172/13, 15, 14, 16, 96, 60; 30/345, 346, 347, 276

[56] References Cited
U.S. PATENT DOCUMENTS

| 2,706,941 | 4/1955 | Swanson | 172/15 |
| 3,018,602 | 1/1962 | Diesterwig | 56/12.7 X |
| 3,104,510 | 9/1963 | Voigt | 56/295 |
| 3,402,542 | 9/1968 | Johnston | 56/295 |
| 3,900,071 | 8/1975 | Crawford | 56/256 |

Primary Examiner—Richard J. Johnson

[57] ABSTRACT

A lawn edging tool to be mounted to a conventional rotating shaft on a lawn edging machine which is composed of a disc-shaped member having radially extending passageways and an inner opening spaced between the center of the disc and the periphery of the disc and in communication with the passageways and sized to nest an enlarged end of a strip of rubbery material, such as a strip cut from a tire carcass and wherein the strip extends radially outwardly through the passageway to serve as flailing members.

2 Claims, 3 Drawing Figures

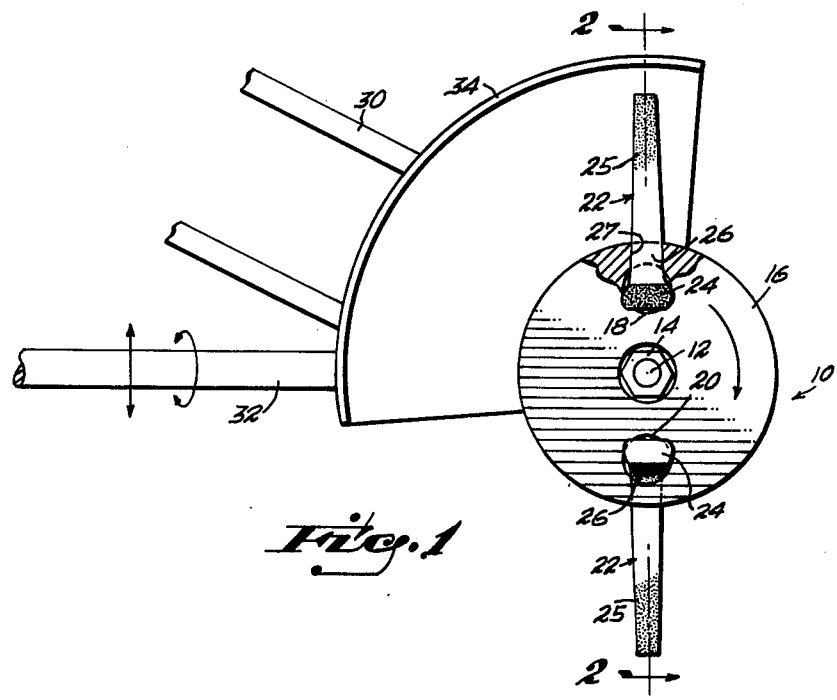
Fig. 1
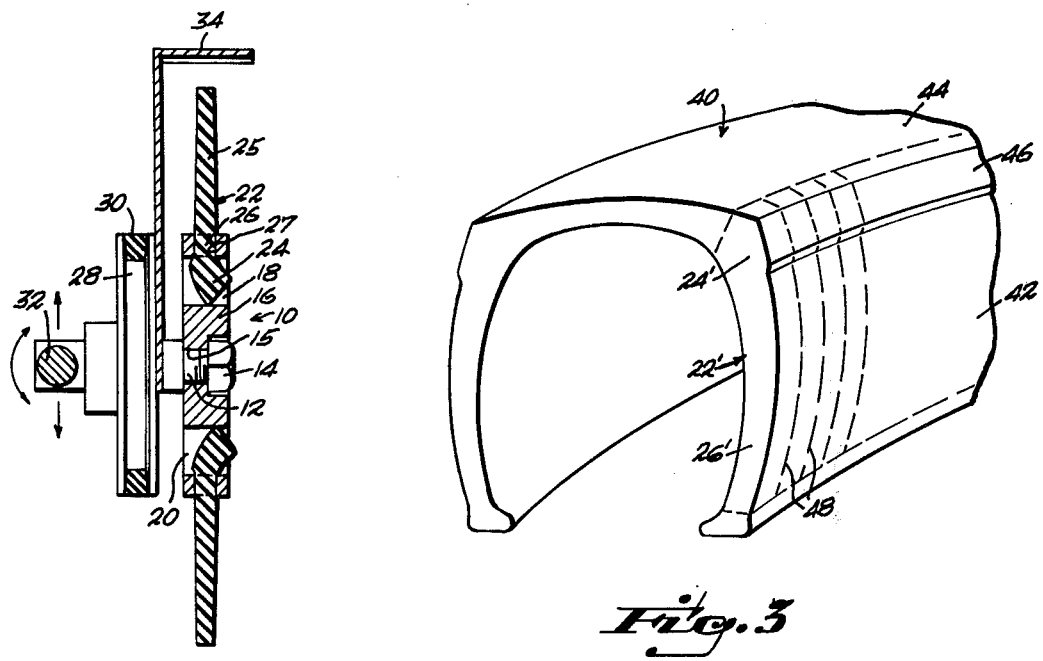
Fig. 2
Fig. 3

TOOL FOR LAWN EDGING MACHINE

FIELD OF THE INVENTION

This invention relates to lawn cutting tools or edgers and, more particularly, to an edger disc with a pair of passageways for receiving flailing strips with an enlarged end nested in a recess.

BACKGROUND OF THE INVENTION

In the past there have been numerous efforts to provide a relatively quiet, safe and efficient, yet inexpensive edging device. Typical prior art devices have utilized metal edger blades which are mounted to a disc to be rotated so as to provide flailing or cutting members in a cutting plane. The instant invention provides such a device and, specifically, a disc with extending or radially projecting flailing members in the form of strips cut from a tire carcas which are sized for passage through a radial opening in the disc and captivated in the disc by an enlarged end of the tire strip, as is seen in FIG. 3 and FIG. 1 of the attached drawings.

REPRESENTATIVE PRIOR ART

In the past, efforts have been made to utilize pieces of line as flailing elements, see U.S. Pat. Nos. 3,708,967, 3,831,278, 4,054,992, and 4,054,993. This invention is of a disc wherein the flailing members are composed of tire carcas strips which are strong, durable, highly resistant and reinforced in most cases by reinforcing of steel, such as the tire types commonly referred to as steel belted radials.

Generally speaking, the present invention provides an edger apparatus to be mounted to a rotatable shaft which is composed of a disc-shaped member to be mounted to the shaft for rotation with it and wherein the disc member has equispaced axial through openings of a size to nest an enlarged end of a tire carcas strip and wherein radially extending passageways communicate with the openings and through which the strips extend as flailing members.

It is a general object of this invention to provide an improved lawn edging disc for use with conventional lawn edgers which is relatively quiet in operation, inexpensive to manufacture and which is safe in operation.

In accordance with these and other objects which will become apparent hereinafter, the instant invention will now be described with reference to the accompanying drawings, in which:

DESCRIPTION OF THE DRAWINGS

FIG. 1 is a side elevation view of a lawn edging machine provided with the instant invention;

FIG. 2 is a view in cross section taken on the plane indicated by the line 2—2 of FIG. 1 and looking in the direction of the arrows;

FIG. 3 is a partial view of a portion of a tire carcas from which flailing strips to be used in the instant invention are severed.

DESCRIPTION OF THE PREFERRED EMBODIMENT

Referring to the drawings wherein like reference characters designate like or corresponding parts throughout the several views and referring particularly to FIG. 1, there is shown a partial view of a conventional edging machine used in trimming the edges of lawns, which machine portion is designated by the numeral 10. It is seen that it includes a rotatable shaft or mounting stud 12 and a nut 14 is provided for keeping a disc-shaped member 16 mounted thereto. The disc may be provided with a recess in the outer face to accommodate the nut 14. In the disc a pair of face holes 18 and 20 are provided. These holes are of a first predetermined diameter to be referred to hereinafter. From a tire carcas generally designated by the numeral 40 in FIG. 3, which is of the type having a side wall 42 and a tread portion 44 and a peripheral bead 46, strips such as 22′ having an enlarged first end 24′ and a portion extending toward a second end zone 26′ are severed as along cut lines designated by the numeral 48. These strips are to be inserted into the face holes in the manner now to be described. Radially extending peripheral passageways, such as 27 of a cross sectional area sized for passage of the extending portion 26′ of the tire strip are provided in communication with the opening. When inserted, each of the strips, as seen in FIG. 1, includes the first end 24 and 26 nested in the face holes of the disc and a radially outwardly extending portion 25 extending from the peripheral surface comprising the flailing members designated by the numeral 22 in FIG. 1. It will be seen that these flailing members are snugly held in position by rotation of the shaft in the direction of the arrow indicated at the right in FIG. 1.

As is conventional, the machine is provided with a shield 34 and a drive pulley 28 operatively connected to a drive belt 30 and, additionally, a control rod 32 for pivotally raising and lowering the cutting edge, that is the outer flailing zone of the whirling disc about a fulcrum not shown and in the direction indicated by the arrowed line at the left of FIG. 1. The control rod is also adapted to be rotated as indicated by the circular arrow to the left of FIG. 1 for altering the angle of the cutting plane, as is conventional.

It is thus seen that the applicant has provided a simple and inexpensive edging disc which utilizes strong, sturdy tire carcas materials which are very durable and which are relatively silent in operation, safe in use, and inexpensive for a user.

While the instant invention has been shown and described in what is considered to be a best preferred embodiment, it is recognized that departures may be made therefrom and accordingly the instant invention is not to be limited but is to be accorded the full scope of the claims set forth hereinafter.

What is claimed is:

1. An edger apparatus to be mounted to a rotatable shaft of a lawn edging machine comprising: a disc-shaped member having a center zone adapted to be mounted for rotation with the rotatable lawn edging machine shaft, said disc having a main axial face bounded by a peripheral surface, said main face having common size recesses of a predetermined size and each of said recesses being spaced a common radial distance between the center zone and the peripheral surface, equispaced radial passageways in the member of a predetermined cross sectional area and each of said passageways being in open communication with one of the recesses and extending to the peripheral surface, and said disc-shaped member being adapted to captivate a strip of tire carcas in each passageway, each strip comprising an elongate body having a first end zone and a second end and being of a common length, the first end zone being characterized by a dimension greater than the maximum distance across the cross sectional area of said passageway and said first end zone of each strip being sized to nest in said recesses, and the length of said body between the first end zone and second end being greater than the common radial distance between each of the recesses and the peripheral surface and being of a cross sectonal area between the first end zone and second end sized for passage through the recess and passageway to extend from the peripheral surface of the disc when the first end zone is nested in the opening and the elongate body is threaded through the passageway, the extending portion from the peripheral surface of said disc-shaped member to said second end comprising a flailing member of tire carcas for cutting vegetation.

2. The device as set forth in claim 1 wherein the disc-shaped member is provided with an axial through mounting hole in said center zone for receiving the shaft and a recess is provided in said axial face to nest a mounting nut therein.

* * * * *